(12) United States Patent
Rinne et al.

(10) Patent No.: US 9,544,779 B2
(45) Date of Patent: Jan. 10, 2017

(54) METHOD AND APPARATUS FOR ACTIVATING FREQUENCIES IN WHITE SPACE

(75) Inventors: Mika Petri Olavi Rinne, Espoo (FI); Mikko Aleksi Uusitalo, Helsinki (FI); Mika Ilkka Tapani Kasslin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 64 days.

(21) Appl. No.: 14/385,417

(22) PCT Filed: Mar. 26, 2012

(86) PCT No.: PCT/IB2012/051438
§ 371 (c)(1),
(2), (4) Date: Sep. 15, 2014

(87) PCT Pub. No.: WO2013/144680
PCT Pub. Date: Oct. 3, 2013

(65) Prior Publication Data
US 2015/0043471 A1 Feb. 12, 2015

(51) Int. Cl.
*H04W 16/14* (2009.01)
*H04W 72/02* (2009.01)
(Continued)

(52) U.S. Cl.
CPC ............ *H04W 16/14* (2013.01); *H04L 5/0053* (2013.01); *H04L 5/0094* (2013.01)

(58) Field of Classification Search
CPC ..... H04L 5/0098; H04W 16/14; H04W 72/02; H04W 72/0406
See application file for complete search history.

(56) References Cited

U.S. PATENT DOCUMENTS 9,413,500 B2 * 8/2016 Chincholi ............... H04L 5/001
2008/0220787 A1 9/2008 Stanwood et al.
(Continued)

FOREIGN PATENT DOCUMENTS

| EP | 2384074 A1 | 11/2011 |
| GB | 2477649 | 8/2011 |
| WO | 2006125738 | 11/2006 |

OTHER PUBLICATIONS

"Huawei Runs LTE in White Spaces", Rethink Wirelesss, Retrieved on Nov. 27, 2014, Webpage available at : http://www.rethinkwireless.com/2011/10/24/huawei-runs-lte-white-spaces.htm.
(Continued)

*Primary Examiner* — Ahmed Elallam
(74) *Attorney, Agent, or Firm* — Mintz Levin Cohn Ferris Glovsky and Popeo, P.C.

(57) ABSTRACT

A method for acquiring spectrum beyond the licensed spectrum for wireless network communications comprising accessing a geolocation database to determine a configuration of white space frequencies that may be available and transmitting the carrier aggregation configuration to user equipment (UE). The carrier aggregation configuration may be at least partially encrypted with the key sequences for the encryption being optionally changed for improved security. The white spaces may be activated in a handshake sequence in which a network node transmits an enabling signal to UE, receives an enabling request from UE specifying which white spaces are requested, and transmits an enabling response. In an alternative to transmitting an enabling response, the node may activate the requested white spaces in an LTE signal.

24 Claims, 7 Drawing Sheets

(51) Int. Cl.
*H04W 72/04* (2009.01)
*H04L 5/00* (2006.01)

(56) References Cited

U.S. PATENT DOCUMENTS

| | | |
|---|---|---|
| 2010/0195580 A1 | 8/2010 | Samarasooriya et al. |
| 2011/0158147 A1 | 6/2011 | Li et al. |
| 2011/0164581 A1 | 7/2011 | Keon |
| 2011/0182257 A1 | 7/2011 | Raveendran et al. |
| 2011/0319129 A1* | 12/2011 | Bhat .................... H04W 72/02 455/552.1 |
| 2012/0039284 A1 | 2/2012 | Barbieri et al. |
| 2012/0077510 A1* | 3/2012 | Chen .................... H04W 28/26 455/452.1 |
| 2012/0094681 A1* | 4/2012 | Freda ................... H04W 72/02 455/452.1 |
| 2012/0250631 A1* | 10/2012 | Hakola ................. H04L 5/001 370/329 |
| 2012/0264440 A1* | 10/2012 | Koskela ............... H04W 72/042 455/450 |
| 2012/0281594 A1* | 11/2012 | Stewart ................ H04W 16/14 370/259 |
| 2012/0307869 A1* | 12/2012 | Charbit ................ H04B 1/715 375/132 |
| 2013/0051214 A1* | 2/2013 | Fong .................... H04W 24/10 370/216 |
| 2013/0072106 A1* | 3/2013 | Koskela ............... H04W 16/14 455/3.01 |
| 2013/0083783 A1* | 4/2013 | Gupta .................. H04W 4/005 370/338 |
| 2013/0195054 A1* | 8/2013 | Horn .................... H04W 12/06 370/329 |
| 2013/0336156 A1* | 12/2013 | Wei ...................... H04L 5/001 370/252 |
| 2014/0204854 A1* | 7/2014 | Freda ................... H04L 1/18 370/329 |
| 2015/0105090 A1* | 4/2015 | Koskela ............... H04W 72/042 455/452.1 |

OTHER PUBLICATIONS

International Search Report received for corresponding Patent Cooperation Treaty Application No. PCT/IB2012/051438, dated Nov. 29, 2012, 3 pages.

* cited by examiner

METHOD AND APPARATUS FOR ACTIVATING FREQUENCIES IN WHITE SPACE

RELATED APPLICATION

This application was originally filed as PCT Application No. PCT/IB2012/051438 filed Mar. 26, 2012.

TECHNOLOGICAL FIELD

An example embodiment relates to the field of wireless mobile communications, more particularly, gaining additional resources for networking in the time and frequency domains from white spaces in the mobile spectrum.

BACKGROUND

The 3GPP Long Term Evolution (LTE) technology is expected to expand to new spectrum, which may operate according to the principles of coexistence on White Spaces (that is, largely unused frequency bands). Currently, for example, the mechanisms for coexistence on television spectrum white spaces are being standardized in IEEE 802.19.1 (for example for the use of 802.11af).

LTE operation on white spaces spectrum requires procedures whose requirements are defined for white spaces operation; that is, procedures required for coexistence between radios on white spaces and procedures to use LTE carriers on white spaces. The problems are numerous, originating from poor coordination of these procedures, duplication of functionality due to the intended use of different spectrum, lack of definitions of security and authentication, high latency of procedures, possible unreliability of procedures due to the characteristics of the white spaces spectrum and heavy requirements for a user device to act frequently on multiple frequencies already at times when the actual data transfer and use of spectrum resources does not yet take place.

BRIEF SUMMARY

A first embodiment is a method to get additional resources for network use from white spaces spectrum. The method may provide the white spaces signaling such as in the licensed spectrum, and hence minimize the effort of transmitting and receiving the enabling handshakes on the white spaces frequencies. In one embodiment, exchange of coded signaling on white spaces frequencies can be avoided, and sequence handshake is sufficient because of the availability of radio resource control (RRC) signaling via the network, such as an LTE network. Once the use of white spaces is enabled, they become quickly available for the actual transmission and reception of transport blocks. Enabling and further keeping the white spaces enabled is handled by minimum signaling on the white spaces, while the control of configurations, timing, security and authorizations are handled by the network, such as by signaling within the licensed spectrum.

One embodiment is a method comprising acquiring spectral resources beyond the licensed spectrum for a wireless network from available white spaces spectrum and identifying a carrier aggregation configuration of available white space frequencies using network signaling in the licensed spectrum. The method may further comprise causing the carrier aggregation configuration of available white space frequencies to be signaled in a radio resource control (RRC) message, with the RRC white space carrier aggregation configuration message being at least partially encrypted or ciphered and integrity protected to avoid fraudulent use of white spaces enablers. The method of one embodiment comprises the network entity signaling an enabling sequence with the carrier aggregation configuration message for receivers to be informed of one sequence to search for enabling signals, and changing key sequences used to encode the enabling sequences to create a trail of sequences to protect the enabling sequences from fraudulent capture.

The method of one embodiment further comprises enabling white space communications using an interactive handshake sequence. The handshake sequence of this embodiment comprises causing at least one enabling signal to be transmitted from a network entity to indicate the availability of one or more white spaces for wireless network communications, receiving at a wireless network entity at least one enabling request for one or more white spaces requesting activation of those white spaces for network communication, and causing an enabling response to be transmitted via network signaling in the licensed spectrum including each white space frequency to be activated in response to the enabling request or, alternatively, activating the requested white space frequencies by causing an LTE Medium Access Control protocol Control Element (MAC CE) signal to be transmitted identifying the frequency list to be activated. The method of one embodiment further comprises activating the requested white space frequencies via an RRC message.

Another embodiment may be an apparatus comprising at least a processor and at least one memory including computer code arranged to, with the processor, cause the apparatus at least to acquire spectral resources beyond the licensed spectrum wireless network communications from available white spaces spectrum and identifying a carrier aggregation configuration of available white space frequencies using network signaling in the licensed spectrum. The processor, memory and computer code further cause the apparatus of one embodiment to enable white space communication using an interactive handshake sequence, wherein the apparatus causes an enabling signal to be transmitted to indicate the availability of one or more white spaces for wireless network communications, receives at a wireless network entity an enabling request for one or more white spaces requesting activation of those white spaces for network communications, and causes an enabling response to be transmitted via network signaling in the licensed spectrum including each white space to be activated in response to the enabling request, or activates the requested white space frequencies by transmitting an LTE Medium Access Control protocol Control Element (MAC CE) signal identifying the frequency list to be activated. In preparation for the handshake sequence the apparatus causes a wireless network entity to access a geolocation database for a list of available white space frequencies, causes the carrier aggregation configuration of available white space frequencies to be signaled in a radio resource control (RRC) message and at least partially encrypt and integrity protect the RRC white space carrier aggregation configuration message to avoid fraudulent use of white spaces enablers. The processor, memory and computer code may further cause the apparatus to cause an enabling sequence to be signaled with the carrier aggregation configuration message for receivers to be informed of one sequence to search for enabling signals, and to change key sequences used to encode the enabling sequences to create a trail of sequences to protect the enabling sequences from fraudulent capture.

Another embodiment may be a computer program product comprising a computer-readable medium having computer code instructions stored therein, wherein the instructions cause a network wireless entity to at least acquire spectral resources beyond the licensed spectrum for wireless network communications from available white spaces spectrum, and identify a carrier aggregation configuration of available white space frequencies using network signaling in the licensed spectrum. The instructions may cause a network wireless entity to enable white space communication using an interactive handshake sequence. In this embodiment, the instructions cause a handshake sequence that comprises causing an enabling signal to be transmitted from a wireless network entity to indicate the availability of one or more white spaces for wireless network communication, receiving an enabling request for one or more white spaces requesting activation of those white spaces for network communication, and causing an enabling response to be transmitted, such as via network signaling in the licensed spectrum including each white space to be activated in response to the enabling request, or activating the requested white space frequencies by causing an LTE Medium Access Control protocol Control Element (MAC CE) signal to be transmitted identifying the frequency list to be activated. The instructions further cause a wireless network entity to at least activate the requested white space frequencies via an RRC message. The computer program product of one embodiment has instructions that further cause a wireless network entity to access a geolocation database for a list of available white space frequencies, cause the carrier aggregation configuration of available white space frequencies to be signaled in a radio resource control (RRC) message, and change key sequences used to encode the enabling sequences to create a trail of sequences to protect the enabling sequences from fraudulent capture.

In yet another embodiment, an apparatus is provided that comprises means, such as a processor and communications interface, for acquiring spectral resources beyond the licensed spectrum for wireless network communications from available white spaces spectrum; and means for identifying a carrier aggregation configuration of available white space frequencies using network signaling in the licensed spectrum. The apparatus of one embodiment may further comprise means, such as a processor or the like, for a wireless network entity to access a geolocation database for a list of available white space frequencies, means, such as a processor and communications interface, for causing the carrier aggregation configuration of available white space frequencies to be signaled in a radio resource control (RRC) message. In one embodiment, the apparatus may also comprise means, such as a processor or the like, for at least partially encrypting and integrity protecting the RRC white space carrier aggregation configuration message to avoid fraudulent use of white spaces enablers, and means, such as a processor and communications interface, for causing an enabling sequence to be signaled with the carrier aggregation configuration message for receivers to be informed of one sequence to search for enabling signals. The apparatus of one embodiment may also comprise means, such as a processor or the like, for changing key sequences used to encode the enabling sequences to create a trail of sequences to protect the enabling sequences from fraudulent capture. The apparatus further comprises means, such as a processor and communications interface, for enabling white space communication using an interactive handshake sequence, means for causing an enabling signal to be transmitted from a wireless network entity to indicate the availability of one or more white spaces for wireless network communication, means for receiving at a wireless network entity an enabling request for one or more white spaces requesting activation of those white spaces for network communication, and means for causing an enabling response to be transmitted, such as via signaling in the licensed spectrum for each white space to be activated in response to the enabling request. The apparatus may further comprise means, such as a processor and communications interface, for activating the requested white space frequencies by causing a Medium Access Control protocol Control Element (MAC CE) signal to be transmitted identifying the frequency list to be activated, and means for activating the requested white space frequencies via an RRC message.

BRIEF DESCRIPTION OF THE DRAWINGS

Figure 1:
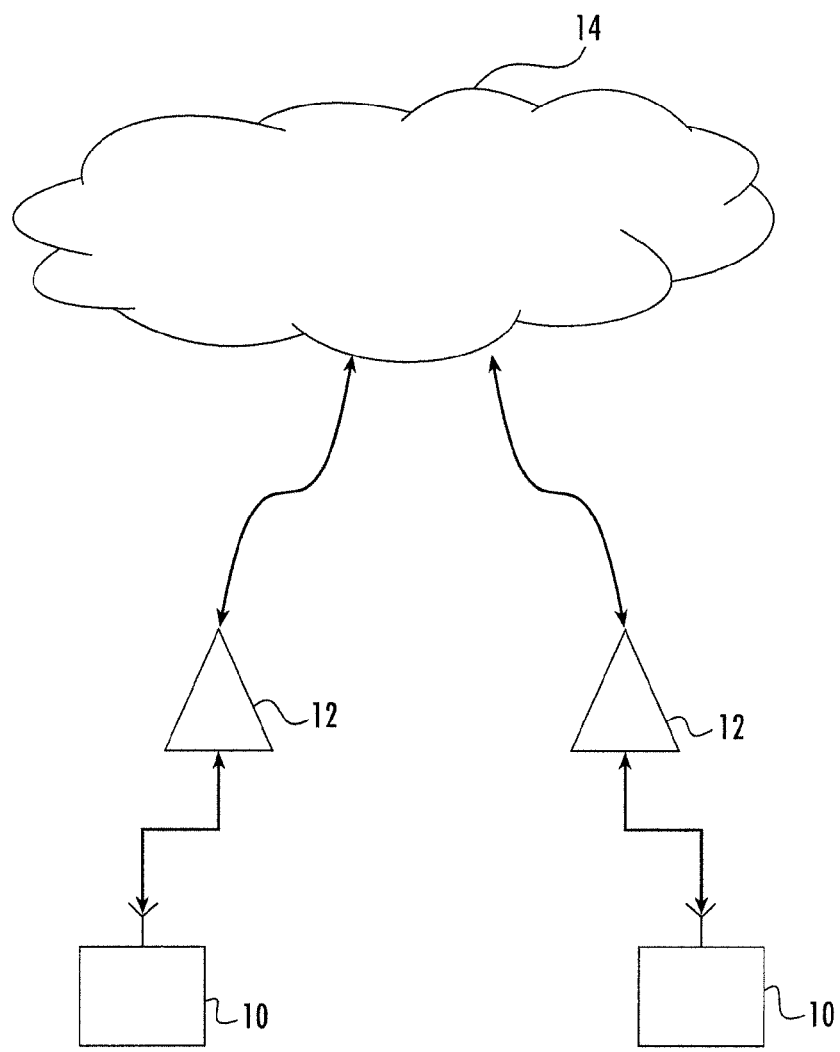
Figure 2:
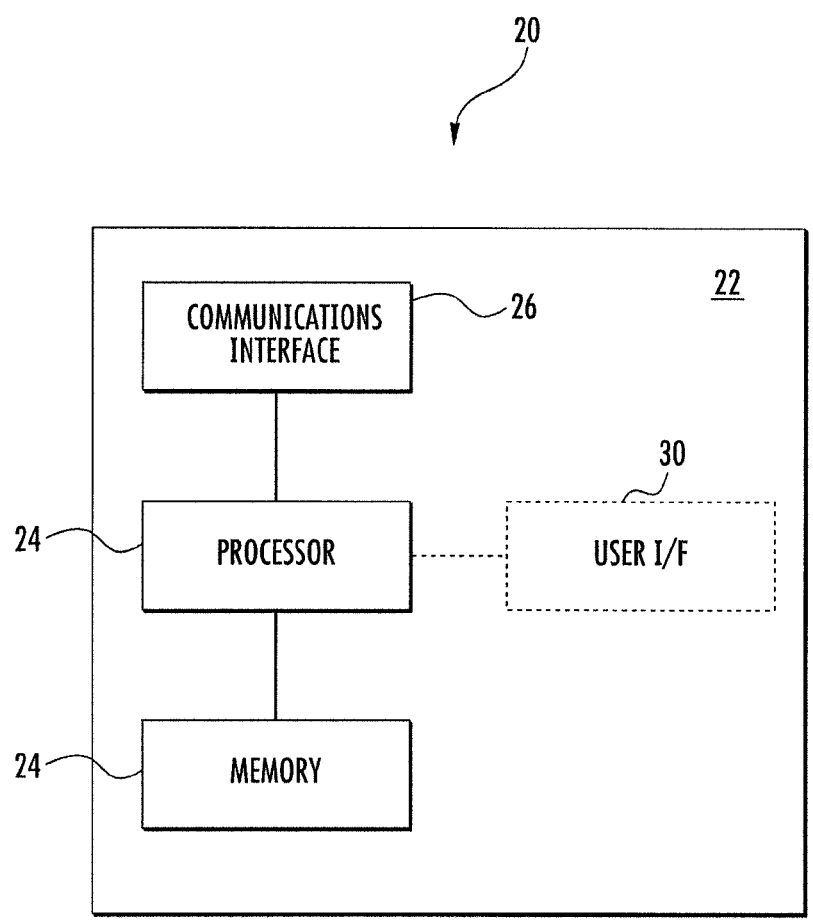
Figure 3:
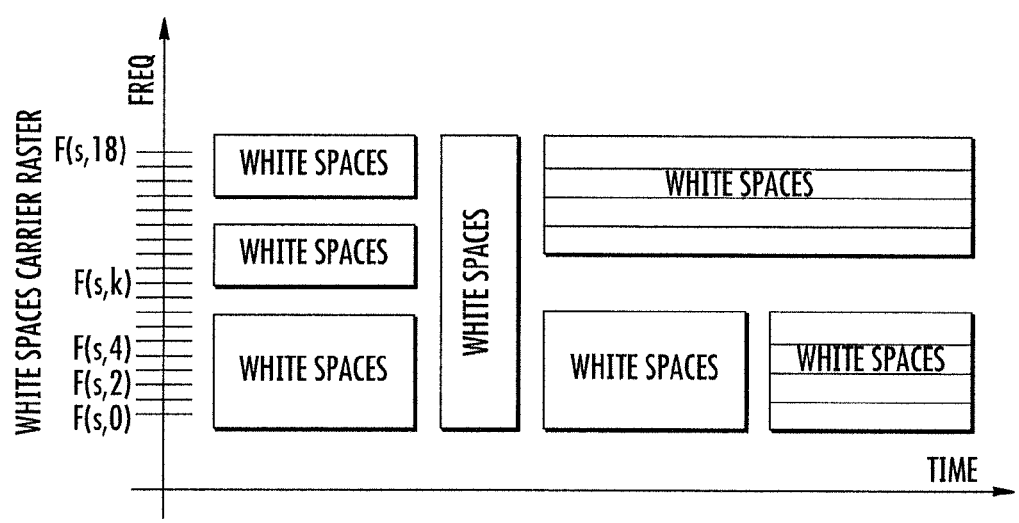
Figure 4:
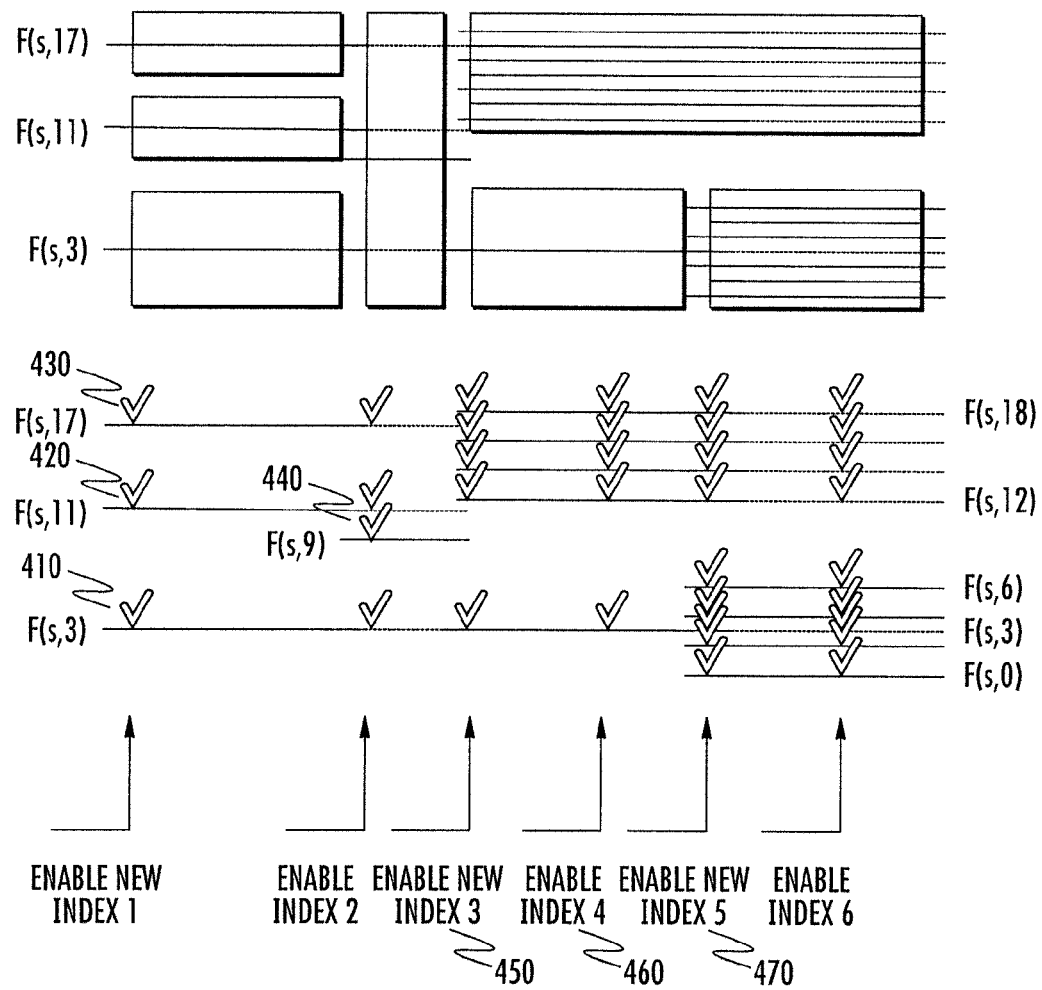
Figure 5:
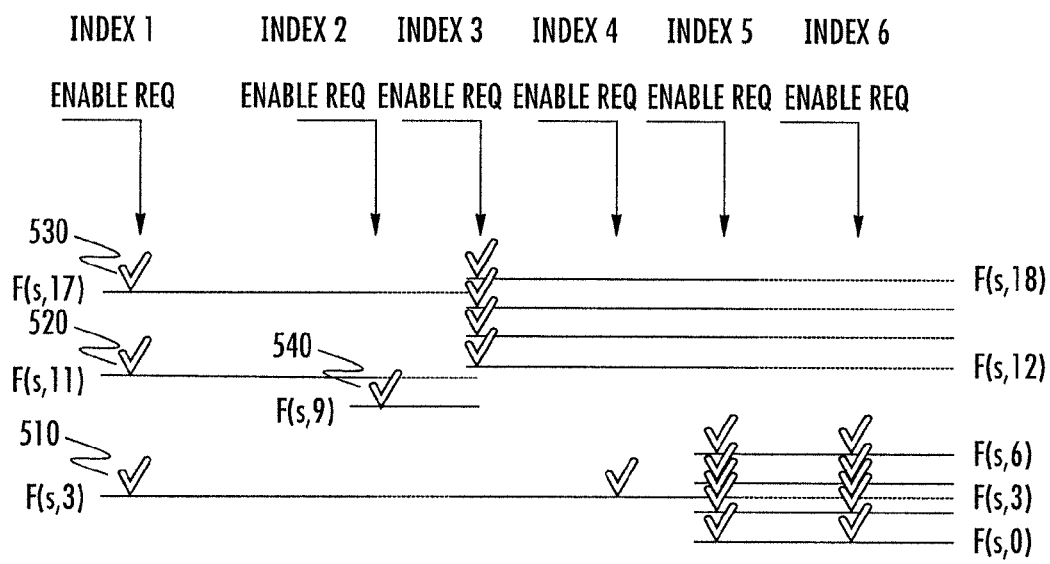

Having thus described certain embodiments of the invention in general terms, reference will now be made to the accompanying drawings, which are not necessarily drawn to scale, and wherein:

FIG. 1 is a schematic diagram of an embodiment of a wireless mobile communications network;

FIG. 2 is a schematic diagram of an embodiment of a mobile terminal;

FIG. 3 is a graphic diagram of white spaces in the frequency and time domains of a geographical area;

FIG. 4 is a graphic diagram of white space identification and enablement over time by the network in accordance with an example embodiment; and FIG. 5 is a graphic diagram of white space enablement requests from user equipment in accordance with an example embodiment.

Figure 6:
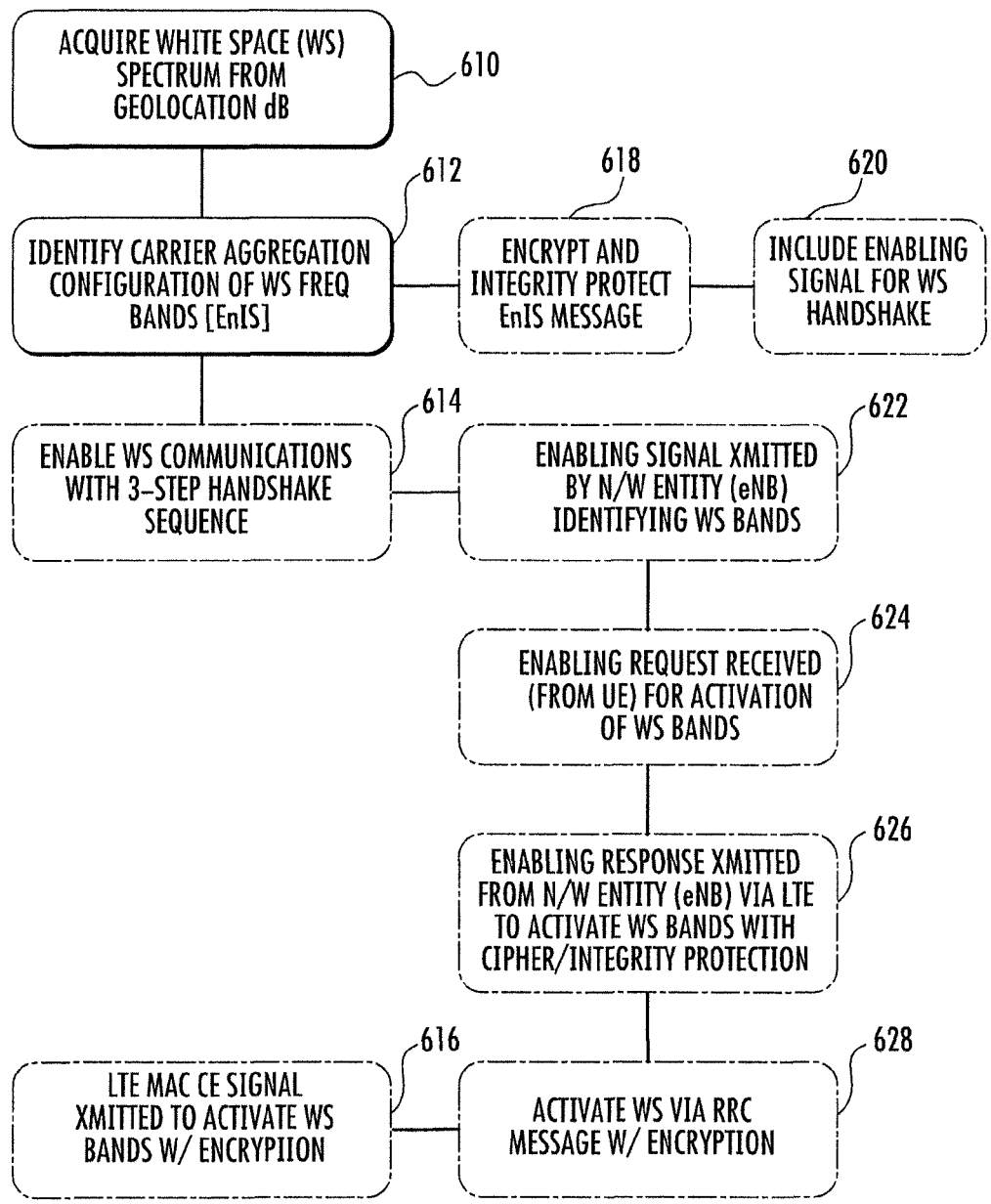

FIG. 6 is a flow diagram of an example embodiment.

Figure 7:
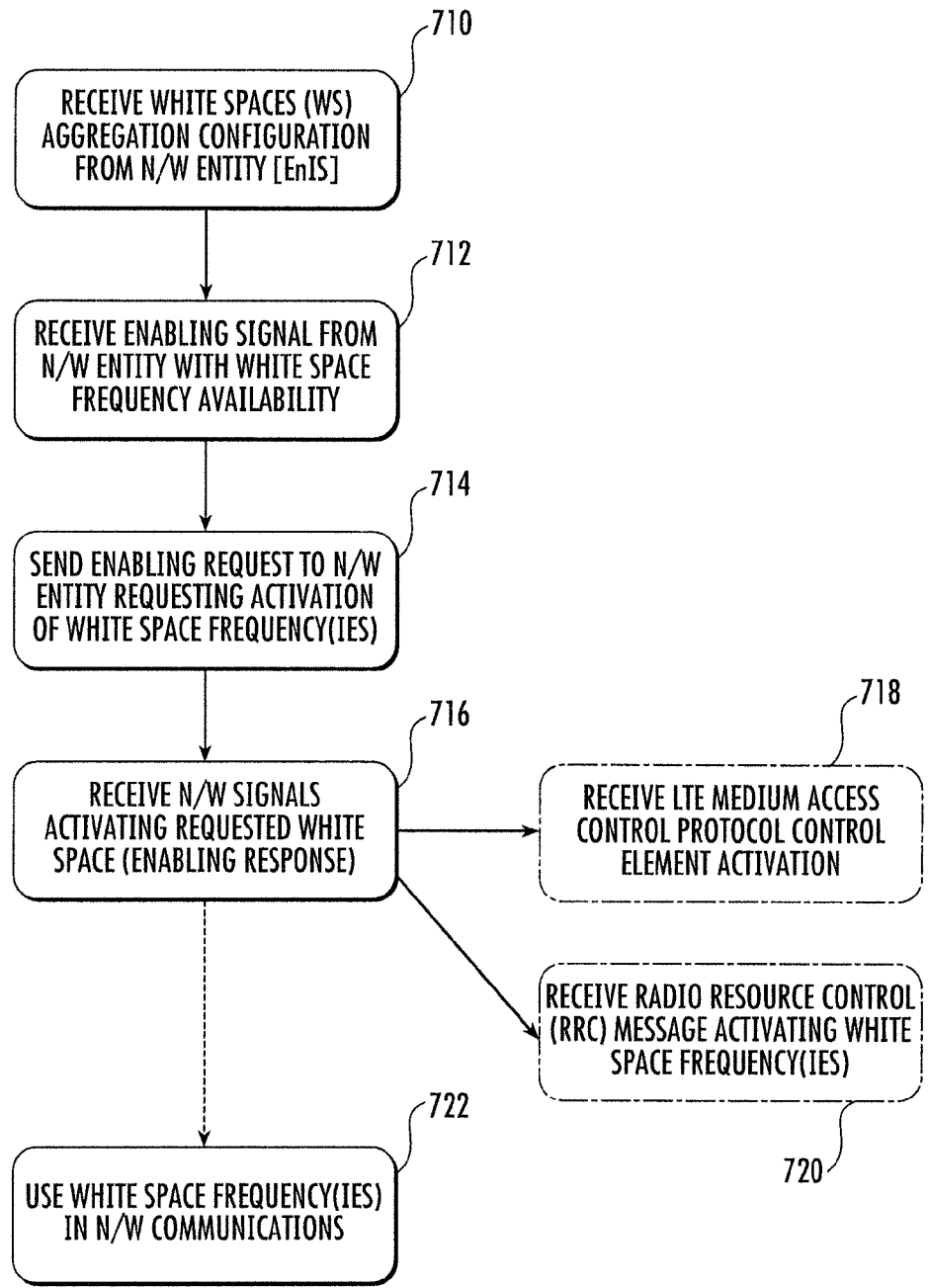

FIG. 7 is a flow diagram of an another example embodiment for user equipment.

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or a server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

A method, apparatus, computer program product are described for acquiring additional spectral resources for wireless network communications from a list of white space frequencies provided by a geolocation database (since the white spaces are location dependent). A network entity, such as an evolved Node B (eNB), may identify a carrier aggregation configuration of available white space frequencies. The carrier aggregation configuration of available white space frequencies may be communicated to user equipment (UE). The network entity may then commence an enabling and activation handshake sequence to expand communications into the white space frequencies. In one embodiment, the eNB transmits an enabling signal to UE to indicate which white space frequencies may be available for use. In turn, the UE transmits as a consequence of correctly detecting the enabling signal, and the eNB receives, an enabling request for one or more of the white space frequencies to be activated. The network entity transmits an enabling response, such as via network, e.g., LTE, signaling in the licensed spectrum, including each white space to be activated in response to the enabling request from UE. eNB may alternatively activate the requested white space frequencies by transmitting an LTE Medium Access Control protocol Control Element (MAC CE) signal identifying the frequency list to be activated, or may activate the requested white space frequencies via a radio resource control (RRC) message.

Although the method, apparatus and computer program product may be implemented in a variety of different systems, one example of such a system is shown in FIG. 1, which includes a mobile terminal 10 that is capable of communicating with a network 14 (e.g., a core network) via, for example, an radio network node like an evolved NodeB (eNB) 12. While the network may be configured in accordance with a Universal Mobile Telecommunications System (UMTS) Terrestrial Radio Access Network (UTRAN), the network may preferably employ other advanced mobile systems such as Long Term Evolution (LTE) or Evolved UTRAN (EUTRAN), LTE-Advanced (LTE-A). These systems may use wideband code division multiple access (W-CDMA), CDMA2000, global system for mobile communications (GSM), general packet radio service (GPRS), LTE, LTE-A and/or the like including their future evolutions, The network 14 may include a collection of various different nodes, devices or functions that may be in communications with each other via corresponding wired and/or wireless interfaces. For example, the network may include one or more base stations, such as one or more node Bs, evolved node Bs (eNBs), access points, relay nodes or the like, each of which may serve a coverage area divided into one or more cells, each of which could be, for example, part of one or more cellular or mobile networks, evolved packet networks or public land mobile networks (PLMNs) or Internet. In turn, other devices such as processing devices (e.g., personal computers, server computers or the like) may be coupled to the mobile network or further to other mobile terminal and/or the second communication device via the network.

The mobile terminal 10 may be in communications with each other or other devices via the network 14. In some cases, each of the communication terminals may include an antenna or antennas for transmitting signals to and for receiving signals from a base station. In some example embodiments, the mobile terminal 10, also known as user equipment (UE), may be a mobile communication device such as, for example, a mobile phone, smartphone, tablet, communicator, portable digital assistant (PDA), pager, laptop computer, table computer, or any of numerous other hand held mobile or portable communication devices, computation devices, content generation devices, content consumption devices, universal serial bus (USB) dongles, data cards, Near Field Communication (NFC) devices or combinations thereof. As such, the mobile terminal 10 may include one or more processors that may define processing circuitry either alone or in combination with one or more memories. The processing circuitry may utilize instructions stored in the memory to cause the mobile terminal to operate in a particular way or execute specific functionality when the instructions are executed by the one or more processors. The mobile terminal 10 may also include communication circuitry and corresponding hardware/software to enable communications with other devices, with the radio network nodes (12) and/or with the network 14.

The mobile terminal 10 and a network entity, such as an eNB 12, may implement an example embodiment of the method, apparatus and computer program product in order to provide for expanded frequency resources, such as white spaces. In this regard, the mobile terminal 10 and a network entity, such as the eNB 12, may each embody or otherwise be associated with an apparatus 20 that is generally depicted in FIG. 2 and that may be configured in accordance with an example embodiment of the present invention as described below, such as described in connection with FIGS. 3-5 below. However, it should be noted that the components, devices or elements described below may not be mandatory and thus some may be omitted in certain embodiments. The components devices and elements may also be software defined and configurable or tunable for different capabilities and they may operate in different frequencies at need. A fixed capability in terms of communicating frequencies is feasible, for example to manufacture a low cost device, for example a machine. Additionally, some embodiments may include further or different components, devices or elements beyond those shown and described herein.

As shown in FIG. 2, the apparatus 20 may include or otherwise be in communication with a processing system including, for example, processing circuitry 22 that is configurable to perform actions in accordance with an example embodiment described herein. The processing circuitry 22 may be configured to perform data processing, application execution and/or other processing and management services according to an example embodiment of the present invention. In some embodiments, the apparatus or the processing circuitry 22 may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry 22 may therefore, in some cases, be configured to implement an embodiment of the present invention on a single chip or as a single "system on a chip" Or it may be implemented as a multichip module. As such, in some cases, a chip or chipset may constitute means for performing one or more operations for providing the functionalities described herein. A chip or a chipset may contain any amount of software or firmware for its functions, or the software, firmware may work in companion to the chip or chipset. The architecture may be programmable, loadable and configurable at need by the software.

In an example embodiment, the processing circuitry 22 may include a processor 24 and memory 28 that may be in communication with or otherwise control a communication interface 26 and, in some cases in which the apparatus is embodied by the mobile terminal 10, a user interface 30. As such, the processing circuitry 22 may be embodied as a circuit chip (e.g., an integrated circuit chip) configured (e.g., with hardware, software or a combination of hardware and software) to perform operations described herein. However, in some embodiments taken in the context of the mobile terminal or a network entity, such as an eNB 12, the processing circuitry may be embodied as a portion of mobile terminal 10 or the network entity 12.

The user interface 30 (if implemented in embodiments of the apparatus 20 embodied by the mobile terminal 10) may be in communication with the processing circuitry to receive an indication of a user input at the user interface and/or to provide an audible, visual, mechanical or other output to the user. As such, the user interface 30 may include, for example, a keyboard, a mouse, a joystick, a display, a touch screen, a microphone, a speaker, and/or other input/output mechanisms. In one embodiment, the user interface includes user interface circuitry configured to facilitate at least some functions of the user equipment by receiving user input and providing output. The user interface may interact with script languages, markup languages and may be able to interact in multiple ways simultaneously. The user interface may further combine user actions to knowledge otherwise available for example from a remote server, via a search engine from the Internet (intranet) or from a database.

The communication interface 26 may include one or more interface mechanisms for enabling communications with other devices and/or networks. In some cases, the communication interface 26 may be any means such as a device or circuitry embodied in either hardware, or a combination of hardware and software that is configured to receive and/or transmit data from/to a network 14 and/or any other device or module in communication with the processing circuitry, such as between the mobile terminal 10 and a network entity, such as an eNB 12. In this regard, the communication interface may include, for example, an antenna (or multiple antennas) and supporting hardware and/or software for enabling communications with a wireless communication network and/or a communication modem or other hardware/software for supporting communications via cable, digital subscriber line (DSL), universal serial bus (USB), Ethernet or other methods.

In an example embodiment, the memory 28 may include one or more non-transitory memory devices such as, for example, volatile and/or non-volatile memory that may be either fixed or removable. The memory 28 may be configured to store information, data, applications, instructions or the like for enabling the apparatus 20 to carry out various functions in accordance with example embodiments of the present invention. For example, the memory 28 could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory 28 may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 24 may be configured to execute instructions stored in the memory 28 or otherwise accessible to the processor. As such, whether configured by hardware or by a combination of hardware and software, the processor may represent an entity (e.g., physically embodied in circuitry—in the form of processing circuitry) capable of performing operations according to an embodiment of the present invention while configured accordingly. Thus, for example, when the processor 24 is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

In one embodiment, a method is provided to obtain additional resources from the white spaces spectrum. Although described herein in conjunction with an LTE network, the method, apparatus and computer program product of other example embodiments may be deployed in conjunction with other types of networks. The method therefore handles the white spaces signaling using network signaling in the licensed spectrum and hence minimizes the effort of transmitting and receiving the enabling handshakes on the white spaces frequencies. In particular, exchange of coded signaling on white spaces frequencies can be avoided, and the handshake by sequences is sufficient, because of the availability of RRC signaling informing at least one of the sequences, the frequencies, the timing, and the configurations via, e.g., an LTE network. Once the use of white spaces is enabled, the enabled frequencies become available for the actual transceiving of transport blocks. Keeping the white spaces enabled may be handled by minimum signaling on the white spaces, while the control of configurations, timing, security and authorizations are handled by the network, such as an LTE network. This method extends carrier aggregation mechanisms to configure, measure and activate/deactivate component carriers, e.g., LTE component carriers on the white spaces.

FIG. 3 depicts several examples of white spaces in time and frequency, whose availability may additionally depend on the geographical area, propagation environment, or the premises of use, and further on characteristics of the transmitting/receiving equipment. The white spaces are expected to be a variable quantity of frequency resources available for a limited time period, in an area. The available frequencies may change over time and by geographic location. In FIG. 3, an example carrier raster is given for a spectral area in a given frequency band (s). However, often spectral white spaces do not per se define a carrier raster, but a carrier raster may be defined by the system, which is going to exploit white spaces for its use. Carrier indices from F(s,0) to F(s,18) represent one white spaces frequency component, for example as parametrised by the network for an intended use. Further white spaces frequency components could be available in other frequency bands. The carrier raster of FIG. 3 gives a possible center frequency for a carrier to occupy a frequency proportion in white spaces. As such, white spaces may just be experienced as amounts of free and usable spectrum resources.

The method described herein enables activation of a network in a spectrum that is available in white spaces, authorized shared access, coexistence, cognitive mechanisms or their combinations. White spaces also include location dependent spectrum other than TV white spaces, for example spectrum resources which are available in areas outside the reach of the incumbent user or system, and hence becoming white spaces. If white spaces are used by authorized shared access, there may be an incumbent user, a primary user or there may be no primary user as a licensee, but multiple mobile network operators may act as licensees or as authorized actors without a license or as secondary users to share this spectrum for their mobile networks. A license or an authorization may be permanent, temporary or may be acquired per need basis, for example it may be acquired from a database from an authority or from a coexistence manager. Other embodiments, for example, apparatus and computer program product embodiments, will also be described below.

According to an embodiment of the invention, the white spaces related signaling is inserted into the Radio Resource Control (RRC) messages of the network that are transmitted within the licensed spectrum. In one embodiment, Signaling Radio Bearer 2 (SRB2) is particularly suited for message transfer that is not that crucial for connection management and mobility in the LTE network. LTE signaling related to the white spaces configuration, definitions of the measurements may be supported by SRB2. Activation/deactivation of white spaces communications may be provided on SRB1 or alternatively on SRB2. Regarding the activation/deactivation of white spaces, other embodiments will address, for example, activation/deactivation of enabled (authorized) white spaces, such as by the LTE Medium Access Control protocol Control Elements (MAC CE).

A method, apparatus and computer program product of an example embodiment minimizes the use of white space frequencies for enabling and activating the white spaces spectrum prior to its use. This reduction is implemented by avoiding channel coded handshake signaling on the white spaces frequencies, but the handshake is instead carried over the licensed band, and just an enabling signal sequence is transmitted by the eNB and is detected by the user equipment (UE). The UE hence avoids search of a coded block of information, avoids its decoding effort and may be tuned to detect a sequence or a set of sequences directly for example by a correlator. In particular, the UE may avoid the long correlation search on white spaces, because the eNB transmitting the enabling sequence may inform UE of at least one of the exact time window and the frequency of transmission, such as by LTE System frame number and a subframe and a center frequency or a channel number, and the actual sequence family and a sequence therein used as the enabling signal. The UE may therefore be mainly silent on white space frequencies, and may capture the given enabling signal precisely within the given time window from the given white spaces frequency. If multiple white space frequencies are to be enabled, they may be enabled simultaneously so that a UE may detect enabling sequences from multiple component carrier positions simultaneously. Other arrangements of transmitting enabling signals are feasible, if the reception is limited by the UE capability, for example the enabling signals may be transmitted for each white spaces frequency component one after another within a set of windows, yet reaching the benefits of easy reception and long silence intervals.

The enabling sequence decided by the eNB may be signaled to the UE beforehand in the white spaces carrier aggregation configuration, so that the UE need not search for a large set of sequences. UE knows exactly the sequence from the given large family of sequences to search. Such sequence families are widely known in literature, like m-sequences, Chadoff-Zhu sequences, computer generated low correlation sequences (for example CAZAC), Fourier, Walsh or Hadamard sequences or pseudo random sequences and many others, or any of their combinations. Conversely, when the UE is expected to send a white spaces enabling request as a response to the detected enabling signal, the eNB should know the enabling request sequence. It may be a complex conjugate of the enabling sequence or an indexed counterpart of the enabling signal. The transmission of the enabling request, such as from UE to eNB, may also happen at a defined subframe interval, or at a known timing relationship relative to the detected enabling signal. The request may in particular be derived from the received enabling signal and matched to the subframe timing (say at subframe +2) so that the eNB knows how to set the detection window for receiving the UE enabling request signals. This method significantly reduces the correlation and search task for the white spaces handshake, both in the UE and in the eNB. The handshaking procedure of one embodiment is illustrated in Table 1. According to the invention, this handshake may be preceded by a white spaces configuration information transmitted from the eNB to the UE.

TABLE 1

| Handshaking to enable operation on a white spaces frequency. | | |
|---|---|---|
| From eNB to UE: | --------→ | enabling signal [WS] |
| to eNB from UE: | ←-------- | enabling request signal [WS] |
| from eNB to UE: | --------→ | enabling response [LTE] |

The eNB that has acquired the authorization from a geolocation database (GDB), may configure all the white spaces frequencies in a transmission to the UE. The eNB may be required to transmit the complete list of white spaces frequencies, in the case of which, the eNB may additionally provide another list or at least an indication in the given complete list of those white spaces frequency components, where it is going to transmit an enabling signal. The eNB may then send an enabling signal, repeatedly, on each one of the enabled frequency components. The UE, after the detection of an enabling signal from the eNB according to the white spaces configuration, may send an enabling request signal to the eNB. The handshake may be completed by the eNB sending an enabling response to the UE on LTE to activate the white spaces frequency components for use. The enabling response may contain further information about the conditions of enabled frequencies, other than that can be delivered in the sequence handshake alone.

FIG. 4 illustrates the enabling signals transmitted by an eNB of an example embodiment on white space frequencies to note the availability of those frequencies. The actual parameters and spectral requirements of a frequency may have been configured to the UE device beforehand. This kind of configuration may further include authorizations, conditions or constraints of use, validity times and their exceptions, After enabling a new white spaces frequency component, successive enabling signals are transmitted at known time instants (time window of sequence length+/−gap), to refresh the continual availability of that frequency component. In this example, at index 1 a first three frequency blocks F(s, 3) [410], F(s, 11) [420] and F(s, 17) [430], which are of different size, are enabled. At index 2, the same three frequency blocks are refreshed to continue to be available, and a new enabling signal is presented to further enable a single larger block F(s, 9) [440] as well.

Referring to FIG. 5, the UE of an example embodiment creates an enabling request signal to the eNB to announce which enabled frequencies the UE would like to use. The UE enabling request signals (510, 520, 530) are shown as a response to the selected eNB enabling signals (FIG. 4, 410 to 430). In this example, at event 1, the UE selected all three enabled white space frequencies F(s, 3) [510], F(s, 11) [520] and F(s, 17) [530] for its enabling request. At index 2, the UE selected only the middle larger frequency block F(s, 9) [540] for its enabling request, though three other frequencies were also alternatively enabled (FIG. 4, Index 2). The UE makes a successive selection of a subset of the number of enabled frequency components to make its enabling requests. The eNB, at each handshake event, decides whether to activate or deactivate, and how to activate, the component carriers on these white space frequencies. In case the frequency components are not of equal size, as in the example above, also the bandwidth of the frequency components may be present for each component in the configuration, In the case of equal size frequency components, a single default value could be given in the configuration.

To complete the three-way handshake, the eNB responds to the request of the UE and announces which frequency components (identified by their parameters) are actually to be used for the transmission. Referring back to FIG. 4, at index 3 the availability of frequencies becomes more fragmented, and the eNB transmits more enabling signals for smaller frequency portions, F(s,3), F(s,12), F(s,14), F(s,16), F(s,18). This situation continues unchanged for index 4. At index 5, more frequency portions appear available, all of which are enabled for a narrower band; F(s,0), F(s,2), F(s,3), F(s,4), F(s,6), F(s,12), F(s,14), F(s,16), F(s,18). The UE, if sending an enabling request for many of these frequency components, some of which may even imply an overlap in frequency, may still allow the eNB to decide the component carriers to allocate or to allocate a single, wider bandwidth component carrier instead of many narrow component carriers, if the white spaces components are contiguous in frequency.

Prior to the enabling handshake sequence, the white spaces configuration can be signaled as the carrier aggregation configuration from the eNB to the UE. It may include the carrier aggregation configuration for white spaces (WS_Config), the white spaces measurements (WS_Meas) and the enabling signal information structure (EnIS). A pseudocode example of EnIS is given below.

```
EnIS { ...
    List of white spaces frequencies <exact copy from the GDB provided info>
    List of white spaces frequencies eNB intends to use <white spaces frequency components>
    Encrypt: Sequence family of the enabling signal <if multiple sequence families are possible>
    Encrypt: Sequence index of the enabling signal for the UE
    ...
    Encrypt: HASH <LTE RRC integrity protection>
}
```

In this structure (EnIS), some Information Elements may be encrypted by the LTE security algorithms. For example, the information about the sequence family and the sequence index could be encrypted (as shown) to prevent fraudulent use of white spaces enablers. The full RRC message including EnIS is ciphered at the Packet Data Convergence protocol (PDCP) over the LTE transport, as usual. The integrity protection HASH prevents any fraudulent modification of the RRC message, so that faulty or harmful operations on white spaces cannot be configured. Any modification to the RRC message can be detected by the HASH, and causes the message to be discarded.

Once the handshaking for the use of white spaces is done, the activation may be done by the Medium Access Control protocol Control Element (MAC CE), also known as the MAC control Packet Data Unit (PDU). An alternative embodiment to activate white spaces use could be carried by a RRC-message. The MAC CE to activate the already enabled white spaces frequency components could simultaneously act as the white spaces enabling response message to complete the three-way handshake of white spaces use. An example of the MAC CE for white spaces operation is given below. The message serves as the required white spaces response and as the LTE carrier aggregation activation/deactivation. An example message might appear as:

```
MAC CE White spaces
    { LCID <Logical channel identity for identifying the MAC CE type of white spaces>
    WS frequency list (center, bw) [ ... ] <list of white spaces frequencies to activate>
    Activation status [bitfield] <single bit per listed frequency; activate/deactivate>
    Next enabling period [SFN, subframe_index]
    ...
    }.
```

As required for the white spaces operations, the enabling handshake has to repeat according to a location and spectrum dependent interval. These parameters vary by frequency band. In one embodiment, the handshake must occur every 5 seconds in one location for a given frequency band, and every 60 seconds in location, for some other frequency band. These intervals could even be much longer reaching minutes, hours or days. However, very long intervals of required handshakes can be taken care by the configuration signaling prior to the handshake, and having the actual handshake period announced more accurately inside the configuration. The eNB may know these requirements from the white spaces geolocation database, and transmits the given sequence periodically for the UE to detect. The timing may be tied to the LTE timing, the System Frame Number (SFN) and the subframe_index [0, 10]. SFN has periodicity of 10 seconds and subframe accuracy is 1 msec, so these may make a sufficient timing reference for the white spaces operation.

The capability of UE to detect the transmitted sequence with a sequence to noise ratio (SNR) or a sequence to interference plus noise ratio (SINR) higher than a predetermined threshold also acts as a check of white spaces operational range. If the UE does not detect the sequence or the UE detects the sequence strength below a required threshold, it will not transmit an enabling request signal to the eNB. In this case, the UE could also report to the eNB an out of range (WS_OOR) report, which indicates that a sufficiently strong sequence was not detected within the expected timing. This may happen either because the UE has moved out of range of the white spaces frequency component or there is a failure case in defining the enabling sequence or its relative timing, or the interference at the receiver is otherwise too high. The failure cases of white spaces handshake can be transmitted by the UE to the eNB in the LTE white spaces measurement report (WS_Meas-Report). Otherwise WS_MeasReport may include the measurement results of any kind expected from the UE according to the definitions of WS_Meas present in the white spaces configuration.

The use of enabling sequences and eNB favorable timing permits the eNB to multiplex multiple sequences to the same time period. The sequence family can be designed so that it is close to orthogonal and have very good cross-correlation properties between the codes of the sequence family. Therefore, for a given time interval determined by the eNB, it may issue several white spaces enabling signals for several UEs at the same time. Even though the multipath propagation and delay spread may reduce the orthogonality of the codes at the receiver, the receiving correlator can detect the sequences. Because the sequences are transmitted from the same transmission point and at equal power, reception is more reliable. By selecting the coordinated time (subframe) of transmissions, the eNB may save transmission power of its white spaces enabling signal, because multiple devices may be enabled simultaneously.

Because the enabling signal may be considered vulnerable and one given sequence should therefore not repeatedly act as an enabling signal for possible fraudulent capture and replication, it is possible to apply a trail of sequences. It is possible to create new key sequences from a single mother code e.g. by combining it to the System Frame Number (SFN). The UE, which knows the mother sequence and SFN timing of the transmission, can generate the actual sequence to detect from the white spaces spectrum at each given time. Any unintended receiver would not know the timing nor the key sequence to detect, even if it accidentally happened to successfully detect one instance of the sequences. Further, coding theory can be applied to the enabling signal to have the sequence protected by a physical layer security algorithm. A large variety of these mechanisms exist for security coding or sequence coding methods.

Referring to FIG. 6 there is illustrated an example embodiment of the method for acquiring spectral resources and enabling their use for communications. Initially, a network entity accesses 610 a geolocation database for identification of white space frequency spectrum available for use. White space is spectrum outside the licensed spectrum for wireless mobile communications. Once the network entity has white spaces frequency information it signals the carrier aggregation configuration to at least a mobile terminal in an Enabling Signal Information Structure (EnIS) 612. At least part of the EnIS signal may be encrypted 618, the EnIS signal itself may be ciphered and it may further be integrity protected for protection against fraudulent capture of the available spectrum information. The network entity initiates the enabling of white space use by commencing a three-step handshake procedure with user equipment (UE) 614. An enabling signal is transmitted 622 by the network entity that identifies to the UE which frequency bands are enabled for use at a particular instant. It is possible that information about the enabling signal or its description, or a formula, an identifier or an index in a given set of sequences may have been included 620 with the EnIS message 618 to the UE. Once UE receive the enabling signal, it (they) may respond with an enabling request 624 for activation of some or all of the frequency bands that were identified in the enabling signal 622. The network entity completes the handshake by transmitting an enabling response 626 via LTE to activate the white spaces for use. The activation of white spaces may be completed with a radio resource control (RRC) signal 628 to UE or, alternatively, with an LTE Medium Access Control protocol Control Element (MAC CE) signal 616. The MAC CE to activate the already enabled white spaces frequency components could simultaneously act as the white spaces enabling response message to complete the three-way handshake of white spaces enablement and use. Both the RRC signal and the MAC CE signal may be at least one of encrypted, ciphered and integrity protected for security purposes. The white spaces identification, enablement and activation sequence must be repeated according to requirements that vary with location.

Referring to FIG. 7, the process of activating white space frequencies is illustrated from the point of view of the user equipment, which must be suitably configured to participate in the interactive three-way handshake protocol. UE initially receives 710 the white space aggregation configuration from the network entity, which the network entity had obtained from a geolocation database containing the local white space frequencies that might be usable for network communications. Next, UE receives 712 an enabling signal from the network entity containing the frequency identifiers that inform the UE what frequencies may be used in the immediate timeframe. This signal 712 initiates the handshake sequence for white space activation and may also function as an alternative signal for identifying an available white space configuration. Responding with the second element of the handshake protocol, UE sends 714 an enabling request to the network entity requesting activation of one or more of the frequencies identified for enablement in the previous 712 signal. Completing the handshake, UE receives 716 at least one signal (the "enabling response") activating the requested white space frequency bands for use in network communications. Alternatively, the network may send an LTE Medium Access Control protocol Control Element (MAC CE) signal 718 with the activation information. As a second alternative, the network may employ a radio resource control (RRC) signal message 720 with the necessary activation signal to complete the handshake and white space frequency activation. With the white space frequency(ies) activated, they are available for the next time interval to be used in network communications 722.

The descriptions of the fundamental apparatus of wireless networks provided above with respect to FIGS. 1 and 2 illustrate the means for accomplishing the functions that are recited in the claims below. Both a network node and a mobile terminal (UE) may comprise at least a processor, a memory, and a communications interface. The UE may also comprise a user interface. The memory in each apparatus may comprise computer code instructions to implement the functions listed in the claims. Thus, a transmission from the eNB may involve the cooperation of the processor, the memory containing computer code instructions, and the communications interface, to transmit the specified information. In like manner, the UE may receive information by cooperation of its communications interface with the processor and computer instructions in its associated memory. Where any claimed function is merely computational it may be performed by the processor alone, or by the processor following instructions in memory, without cooperation with the communications interface.

There are several advantages to the white spaces enabling/request and handshake protocol described herein. Networks, such as LTE networks, can utilize more spectrum resources and new spectrum beyond the licensed spectrum. Devices may coexist in the white spaces spectrum and fill spectral coexistence requirements. The signaling of white spaces configuration via network signaling in the licensed spectrum is reliable and can be optimized. Signaling for the enabling handshake on white spaces frequencies is minimal. Security functions need not be duplicated; standard network security and integrity protection serve white spaces operations. Timing can be controlled by the eNB, making reception moments known, reducing search and detection time. Processing power and energy are conserved at both the eNB and UE. Access to white spaces is faster and more effective. Momentary exploitation of enabled white spaces frequencies is effective because of carrier aggregation, such as in LTE, while secondary component carriers on white spaces may be activated and deactivated by the, e.g., MAC CE.

The following list presents abbreviations and acronyms that have appeared in the specification and that may be found in the claims.

3GPP=Third Generation Partnership Project
    ASA=Authorized shared Access
    CM=Coexistence manager, an architectural element according to IEEE 802.19.x
    CE=Coexistence enabler, an architectural element according to IEEE 802.19.x
    eNB=LTE evolved NodeB, LTE base station
    EnIS=White spaces enabling Information Structure
    EUTRA=Evolved Universal Terrestrial Radio Access
    EUTRAN=EUTRA network
    GDB=Geolocation database
    HASH=encrypted checksum for message integrity protection
    IEEE 802.19.1=standard for coexistence on TV white spaces
    LCID=Logical Channel Identity
    LTE=Long Term Evolution, 3GPP EUTRA, EUTRAN technology
    MAC=Medium Access Control protocol
    MAC CE=MAC Control element=MAC Control PDU
    PCC=Primary Component Carrier in a carrier aggregation scheme
    Pcell=Primary cell of a carrier aggregation scheme
    PDCP=Packet Data Convergence Protocol
    RRC=Radio Resource Control protocol
    SCC=Secondary Component carrier in a carrier aggregation scheme
    Scell=Secondary cell of a carrier aggregation scheme
    SDO=Standard Defining Organization
    SFN=System Frame Number of LTE
    UE=User Equipment
    WS=white spaces
    WS_Config=carrier aggregation configuration for white spaces
    WS_Meas=Measurements for white spaces
    WS_MeasReport=Measurement report for white spaces
    WS_OOR=Measurement report of type white spaces out of range Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. A method comprising:
    acquiring, by a wireless network entity, spectral resources beyond a licensed spectrum for wireless network communications, from an available spectrum, the spectral resources including available white space frequencies;
    identifying, by the wireless network entity, a carrier aggregation configuration of at least a portion of the available white space frequencies, using network signaling in the licensed spectrum; and
    receiving, at the wireless network entity, an indication of one or more of the available white space frequencies which a user equipment requests to be activated for communication according to the carrier aggregation configuration.

2. The method of claim 1 further comprising:
    enabling white space communications using an interactive handshake sequence.

3. The method of claim 2 further comprising:
    causing an enabling signal to be transmitted from the wireless network entity to the user equipment, the enabling signal indicating the availability of one or more white spaces for wireless network communications.

4. The method of claim 3, wherein the indication is received in an enabling request from the user equipment.

5. The method of claim 4 further comprising:
    causing an enabling response to be transmitted for at least a white spaces frequency component to be activated in response to the enabling request.

6. The method of claim 4 further comprising:
    activating the requested white space frequencies by causing a medium access control protocol control element to be transmitted identifying a frequency list to be activated.

7. The method of claim 4 further comprising:
    activating the requested white space frequencies via a radio resource control message.

8. The method of claim 1 further comprising:
    causing the carrier aggregation configuration of available white space frequencies to be signaled in a radio resource control message.

9. The method of claim 8 further comprising:
    causing an enabling sequence to be signaled with the carrier aggregation configuration message.

10. The method of claim 9 further comprising:
    changing key sequences used to encode the enabling signal sequences to create a trail of sequences.

11. An apparatus comprising:
    at least a processor and at least one memory including computer code arranged to, with the processor, cause the apparatus at least to:
        acquire spectral resources beyond a licensed spectrum for wireless network communications, from an available spectrum, the spectral resources including available white space frequencies;

identify a carrier aggregation configuration of at least a portion of the available white space frequencies, using network signaling within the licensed spectrum; and receive an indication of one or more of the available white space frequencies which a user equipment requests to be activated for communication according to the carrier aggregation configuration.

12. The apparatus of claim 11 wherein the processor, memory and computer code further cause the apparatus to:
enable white space communications using an interactive handshake sequence.

13. The apparatus of claim 12 wherein the processor, memory and computer code further cause the apparatus to:
cause an enabling signal to be transmitted to the user equipment, the enabling signal indicating the availability of one or more white spaces for wireless network communications.

14. The apparatus of claim 13 wherein the indication is received in an enabling request from the user equipment.

15. The apparatus of claim 14 wherein the processor, memory and computer code further cause the apparatus to:
cause an enabling response to be transmitted for at least one white spaces frequency to be activated in response to the enabling request.

16. The apparatus of claim 14 wherein the processor, memory and computer code further cause the apparatus to:
activate the requested white space frequencies by causing a medium access control protocol control element signal to be transmitted identifying a frequency list to be activated.

17. The apparatus of claim 14 wherein the processor, memory and computer code further cause the apparatus to:
activate the requested white space frequencies via a radio resource control message.

18. The apparatus of claim 11 wherein the processor, memory and computer code further cause the apparatus to:
cause the carrier aggregation configuration of available white space frequencies to be signaled in a radio resource control message.

19. The apparatus of claim 18 wherein the processor, memory and computer code further cause the apparatus to:
cause a network entity to signal a description of at least an enabling sequence with the carrier aggregation configuration message.

20. The apparatus of claim 19 wherein the processor, memory and computer code further cause the apparatus to:
change key sequences used to encode the enabling sequences to create a trail of sequences.

21. An apparatus comprising:
at least a processor and at least one memory including computer code arranged to, with the processor, cause the apparatus at least to:
cause a carrier aggregation configuration of available white space frequencies to be received by network signaling within the licensed spectrum;
cause an enabling signal to be received from a wireless network entity, the enabling signal indicating the availability of one or more white spaces for wireless network communications according to the carrier aggregation configuration; and
cause an enabling request to be transmitted to the wireless network entity, the enabling request requesting at least a portion of the one or more available white spaces be activated.

22. The apparatus of claim 21 wherein the processor, memory and computer code further cause the apparatus to at least:
receive the enabling signal via at least one of the one or more available white spaces.

23. The apparatus of claim 21 wherein the processor, memory and computer code further cause the apparatus to at least:
cause an enabling response to be received for at least one white spaces frequency to be activated in response to the enabling request.

24. The apparatus of claim 21 wherein the processor, memory and computer code further cause the apparatus to at least:
receive a medium access control protocol control element signal identifying a white spaces frequency list to be activated in response to the enabling request.

* * * * *